(12) United States Patent
Blichmann

(10) Patent No.: US 8,152,115 B2
(45) Date of Patent: Apr. 10, 2012

(54) BEER BREWING STAND

(76) Inventor: John Richard Blichmann, Lafayette, IN (US)

( * ) Notice: Subject to any disclaimer, the term of this patent is extended or adjusted under 35 U.S.C. 154(b) by 393 days.

(21) Appl. No.: 12/456,327

(22) Filed: Jun. 16, 2009

(65) Prior Publication Data

US 2009/0308992 A1    Dec. 17, 2009

Related U.S. Application Data

(60) Provisional application No. 61/132,154, filed on Jun. 16, 2008.

(51) Int. Cl.
*F16M 13/00* (2006.01)
*A47B 47/00* (2006.01)

(52) U.S. Cl. .......... 248/159; 248/121; 248/245; 211/37; 211/193

(58) Field of Classification Search ............. 248/159, 248/121, 158, 125.1, 235, 245; 211/37, 193
See application file for complete search history.

(56) References Cited

U.S. PATENT DOCUMENTS

| | | | | |
|---|---|---|---|---|
| 3,190,454 A | * | 6/1965 | Brooks | 211/85.21 |
| 3,250,584 A | * | 5/1966 | Tassell | 312/247 |
| 3,958,695 A | * | 5/1976 | Allsop et al. | 211/37 |
| 4,192,424 A | * | 3/1980 | Allsop | 211/37 |
| 4,865,283 A | * | 9/1989 | Parker | 248/159 |

* cited by examiner

*Primary Examiner* — Anita M King

(57) ABSTRACT

An improved brewing stand enables ease of assembly, repeated assembly and disassembly allowing the brewing stand to be transported from one location to another location. The modular assembly enables a plurality of tiers to be positioned in an infinite number of vertical positions between a bottom of a mast and a top of the mast. A plurality of legs are removably attached to the bottom of the mast. Leveling devices are provided to maintain the mast in a vertical position.

20 Claims, 4 Drawing Sheets

US 8,152,115 B2

BEER BREWING STAND

CROSS REFERENCE TO RELATED APPLICATION

This application claims benefit of U.S. Provisional Application Ser. No. 61/132,154, filed Jun. 16, 2008.

FIELD OF THE INVENTION

This invention relates generally to a stand, specifically to place devices, such as pots, on at different levels or elevations during the process of brewing beer.

BACKGROUND

It is well known in the beer brewing industry, particularly the homemade or small scale beer making industry, to utilize a stand to support one or more pots for the all grain beer making process (as opposed to a malt extract brewing process where only one vessel is utilized). Typically, one pot or vessel is used for holding hot water (hot liquor tank), another for the mash (mash tun), and a third for a boil vessel. During different stages of the brewing process it is necessary to move the liquid from one pot to another. Often this is done with a pump with the vessels all at one level. However, it is advantageous to use gravity to drain or siphon the liquid in lieu of pumping. This eliminates the cost of a pump, additional cleaning, and can be done without electrical power. To function, each pot must be at a lower level than the vessel being drained. To accomplish this, a stand is used with one or more tiers (typically 3) with each tier higher than the preceding tier. Typical construction is welded structural steel or wood. However, these designs have significant limitations since once constructed, the tiers can not readily be moved should the brewer upgrade equipment or change their brewing process. In addition, any equipment already owned by the brewer, such as a burner, cannot readily be reused in the stand and must be abandoned further adding to the cost of the stand. Yet more limitations of the current art is that shipping costs are high due to the bulky nature of these fixed stands. This also makes them less portable for transporting the stand for brewing at other locations. The present invention overcomes these limitations by integrating a fully modular, adjustable tier installation system along with a burner system that can be used as a stand-alone floor standing burner or fixed to the stand for use in a tiered system. This allows the beginning brewer to purchase a floor standing burner for basic malt extract brewing, and later upgrade to intermediate brewing on a multi-tiered stand, then to advanced brewing all without discarding previously purchased equipment. Furthermore, the brewer can readily reconfigure the tier positions as their brewing process or equipment needs or sizes change.

BRIEF SUMMARY OF THE INVENTION

A modular stand is adapted for use with a brewing process and is comprised of a mast defining a bottom, a top and a plurality of sides. The sides are connected at a corner portion. Positioned on each of the plurality of sides are a plurality of mast faces extend between the bottom and the top of the mast. A plurality of T-slots are positioned on each of the plurality of sides and are interposed the plurality of mask faces, the plurality of T-slots extend between the bottom and the top. Each of the plurality of mast faces form a continuous mast face from the bottom to the top. The plurality of T-slots form a continuous T-slot from the bottom to the top. A plurality of legs are removably attached to the mast near the bottom. Each of the plurality of legs has a first end portion, a second end portion, and a support face. The first end portion is positioned in contacting relationship with at least two of the plurality of mast faces. And, a through hole is positioned in the first end portion and is in alignment with one of the plurality of T-slots. A nut is positioned in the of the plurality of T-slots and is aligned with the through hole and has a fastener positioned in the through hole and threadedly secures the plurality of legs with the mast. The support face neat the second end portion has a leveling device attached thereto positioning the mast in a vertical position. And, a plurality of tier assemblies are removably attached to the mast. Each of the plurality of tier assemblies are movably spaced from the bottom and the top at a vertical positions. Each of the plurality of tier assemblies have an arm defining a mast end portion and a shelf end portion. The mast end portion has a through hole positioned therein and is in alignment with one of the plurality of T-slots. The mast end portion is positioned in contacting relationship with at least two of the plurality of mast faces. The shelf end portion has a through hole therein, each of the plurality of tier assemblies has one of a burner assembly and a shelf assembly attached by a fastener positioned in the through hole in the shelf end portion of the arm.

In another aspect of the invention a method of assembling a modular stand comprises the step of positioning one of a plurality of legs on a side at a bottom of a mast by placing a first end portion of the one of the plurality of legs in contacting relationship with at least two of a plurality of mast faces on the mast, aligning a through hole in the first end portion of the one of the plurality of legs with a T-slot in the mast, positioning a nut in the T-slot and aligning the through hole with the nut, inserting a fastener through the through hole in the first end portion of the one of the plurality of legs and threading the fastener into the nut. And, positioning a second one of the plurality of legs on one of the side and one of another side and the bottom of the mast, placing a first end portion of the second one of the plurality of legs in contacting relationship with at least two of the plurality of mast faces on the mast, aligning a through hole in a first end portion of the second one of the plurality of legs with an additional T-slot in the mast, positioning a nut in the additional T-slot and aligning the through hole with the nut, inserting a fastener through the through hole in the first end portion of the second one of the plurality of legs and threading the fastener into the nut. And, positioning a third one of the plurality of legs on one of the side and one of another side and the bottom of the mast, placing a first end portion of the third one of the plurality of legs in contacting relationship with at least two of the plurality of mast faces on the mast, aligning a through hole in a first end portion of the third one of the plurality of legs with a further additional T-slot in the mast, positioning a nut in the further additional T-slot and aligning the through hole with the nut, inserting a fastener through the through hole in the first end portion of the third one of the plurality of legs and threading the fastener into the nut. And, tightening each of the fasteners in the first one of the plurality of legs, the second one of the plurality of legs, and the third one of the plurality of legs. And, attaching a leveling device to a support face near a second end portion of each of the first one of the plurality of legs, the second one of the plurality of legs and the third one of the plurality of legs. And, adjusting the leveling device in each of the first one of the plurality of legs, the second one of the plurality of legs, and the third one of the plurality of legs, the adjusting placing the mast in a vertical alignment. And, positioning one of a plurality of tier assemblies on the mast intermediate the bottom and a top of the mast, placing a mast end portion of an arm of the one of the plurality of tier assemblies in contacting relationship with at least two of said plurality of mast faces on the mast, aligning a through hole in the mast end portion of the arm of the one of the plurality of tier assemblies with a T-slot in the mast, positioning a nut in the T-slot and aligning the through hole with the nut, inserting a fastener through the through hole in the one of the plurality of tier assemblies and threading the fastener into the nut, tightening the fastener positioning the one of the plurality of tier assemblies on the mast intermediate the bottom and the top of the mast. And, positioning a second one of the plurality of tier assemblies on the mast intermediate the one of the plurality of tier assemblies and the top of the mast, placing a mast end portion of an arm of the second one of the plurality of tier assemblies in contacting relationship with at least two of the plurality of mast faces on the mast, aligning a through hole in the mast end portion of the arm of the second one of the plurality of tier assemblies with a T-slot in the mast, positioning a nut in the T-slot and aligning the through hole with the nut, inserting a fastener through the through hole in the second one of the plurality of tier assemblies and threading the fastener into the nut and tightening the fastener positioning the second one of the plurality of tier assemblies on the mast intermediate the first one of the plurality of tier assemblies and the top of the mast.

And in another aspect of the invention a modular stand comprises a mast defining a bottom, a top and a plurality of sides, the sides connected at a corner portion. Positioned on each of the plurality of sides are a plurality of mast faces extend between the bottom and the top. A plurality of T-slots are positioned on each of the plurality of sides and are interposed the plurality of mask faces, the plurality of T-slots extend between the bottom and the top. Each of the plurality of mast faces form a continuous mast face from the bottom to the top. The plurality of T-slots form a continuous T-slot from the bottom to the top. A plurality of legs are removably attached to the mast near the bottom, each of the plurality of legs have a first end portion, a second end portion, and a support face. The first end portion is positioned in contacting relationship with at least two of the plurality of mast faces, and a through hole is positioned in the first end portion and is in alignment with one of the plurality of T-slots. A nut is positioned in one of the plurality of T-slots and is aligned with the through hole and has a fastener positioned in the through hole and threadedly secures the plurality of legs with the mast. The support face neat the second end portion has a leveling device attached thereto positioning the mast in a vertical position. A plurality of tier assemblies are removably attached to the mast, each of the plurality of tier assemblies are movably spaced from the bottom and the top at a horizontal positions. Each of the plurality of tier assemblies has an arm defining a mast end portion and a shelf end portion, the mast end portion has a through holes positioned therein and is in alignment with one of the plurality of T-slots. The mast end portion is positioned in contacting relationship with at least two of the plurality of mast faces. The shelf end portion has a through hole therein. Each of the plurality of tier assemblies has one of a burner assembly and a shelf assembly attached by a fastener positioned in the through hole in the shelf end portion of the arm. And, a brewing apparatus has a burner attached to at least one of the plurality of tier assemblies, a pot or vessel is positioned on at least one of the plurality of tier assemblies and a drain or siphon is positioned in the pot or vessel.

DESCRIPTION OF THE PREFERRED EMBODIMENT

Figure 1:
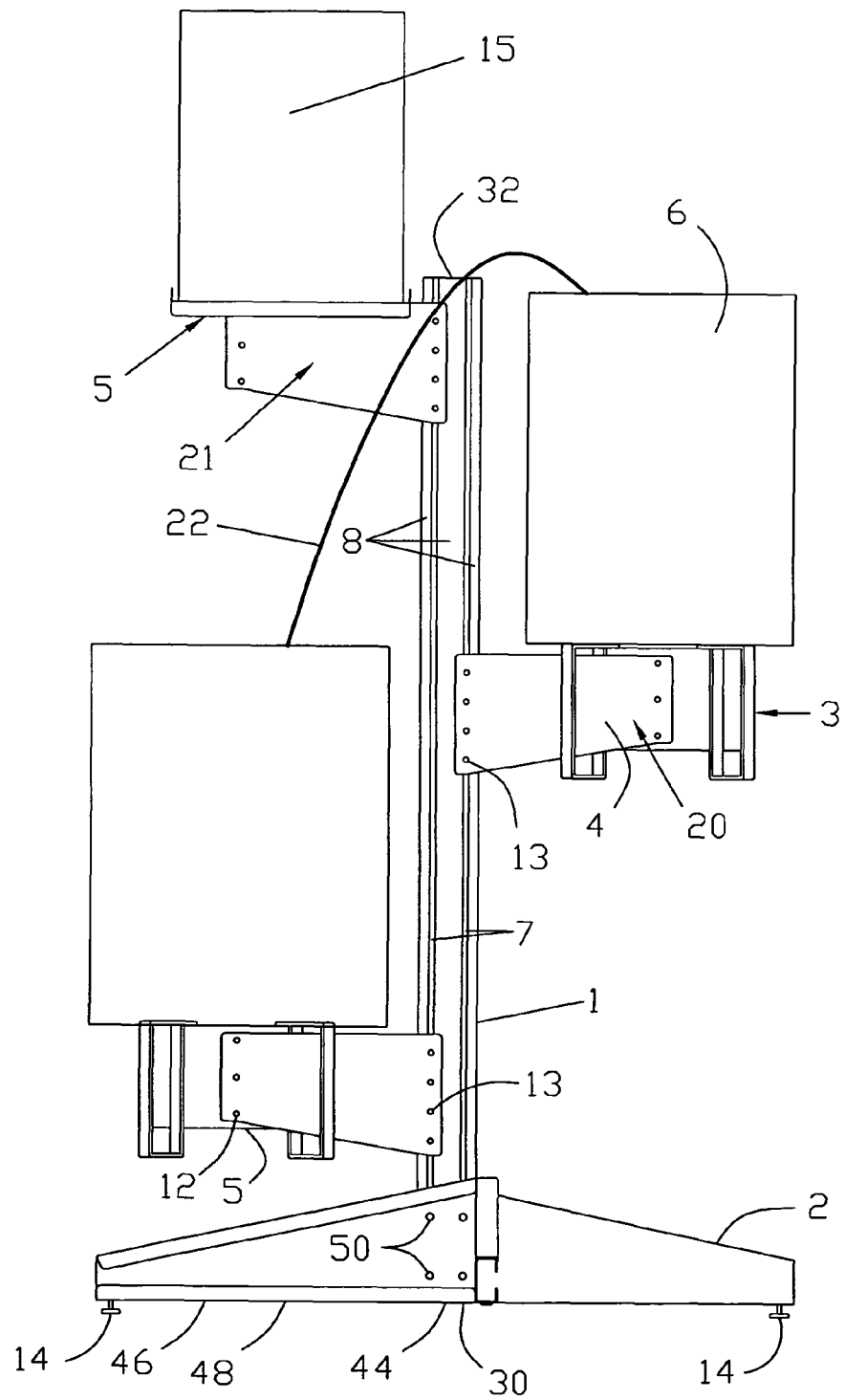
FIG. 1 is a side elevational view of the stand configuration.
Figure 2:
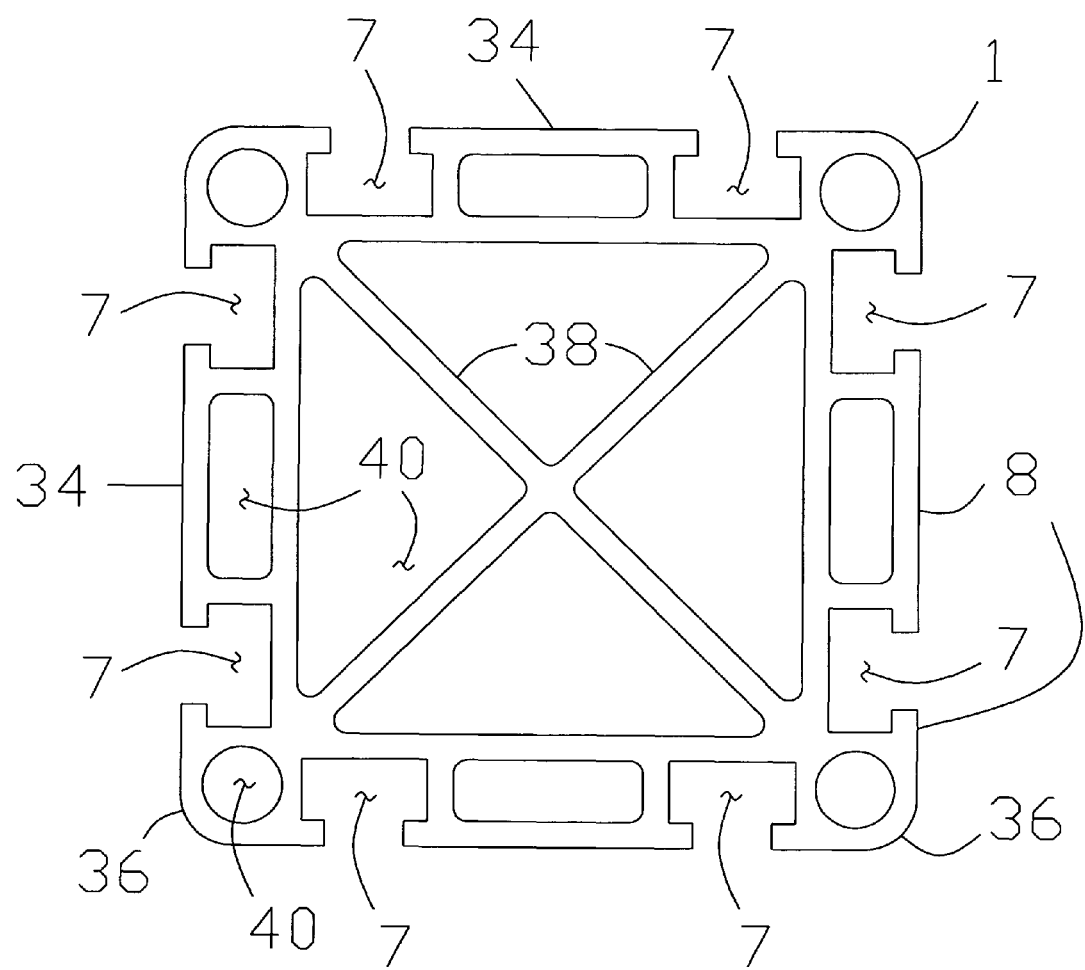
FIG. 2 is a top view of the mast showing the geometry and configuration thereof.
Figure 3:
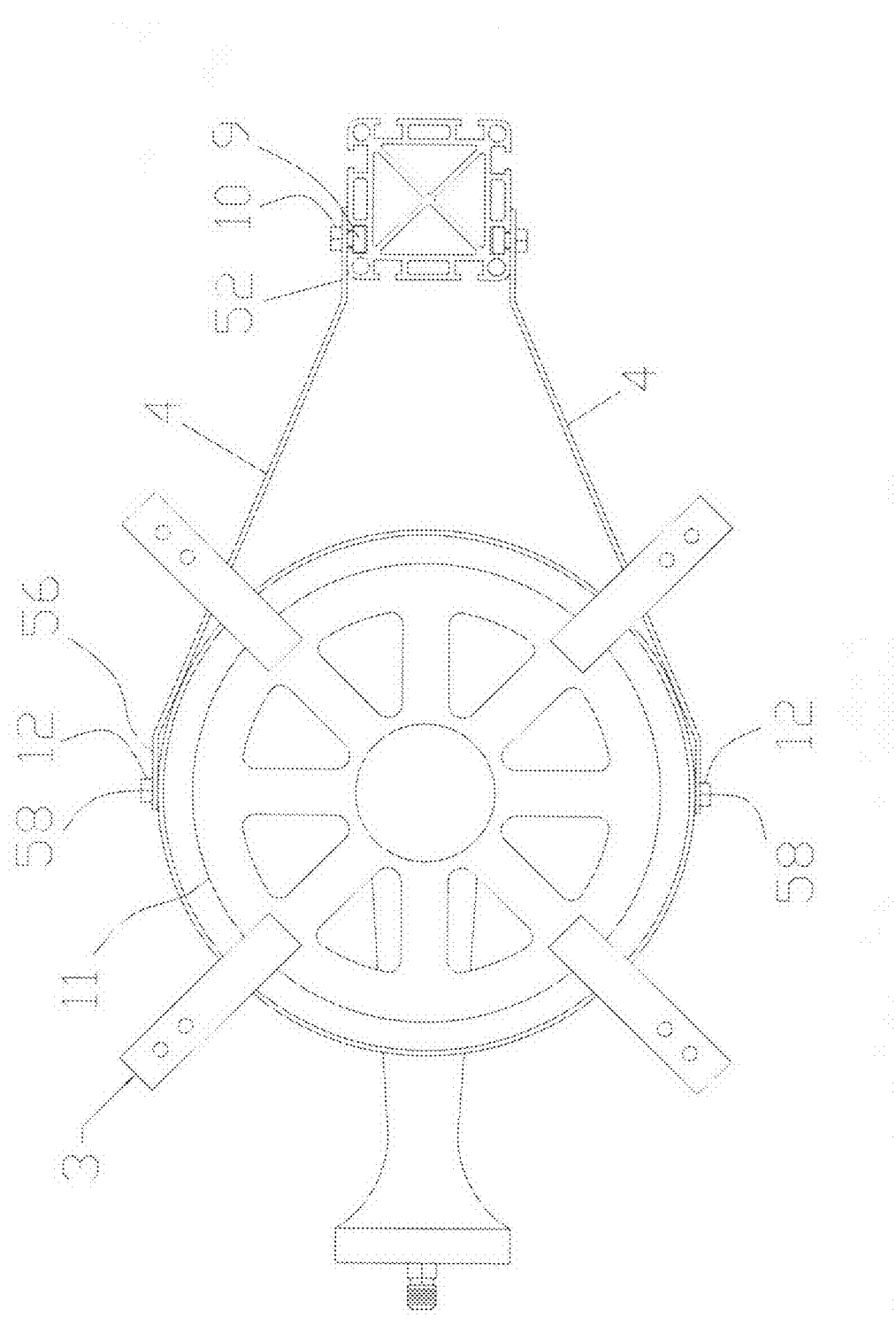
FIG. 3 is a sectional view through the mast showing an elevational view of one of the shelf tiers.
Figure 4:
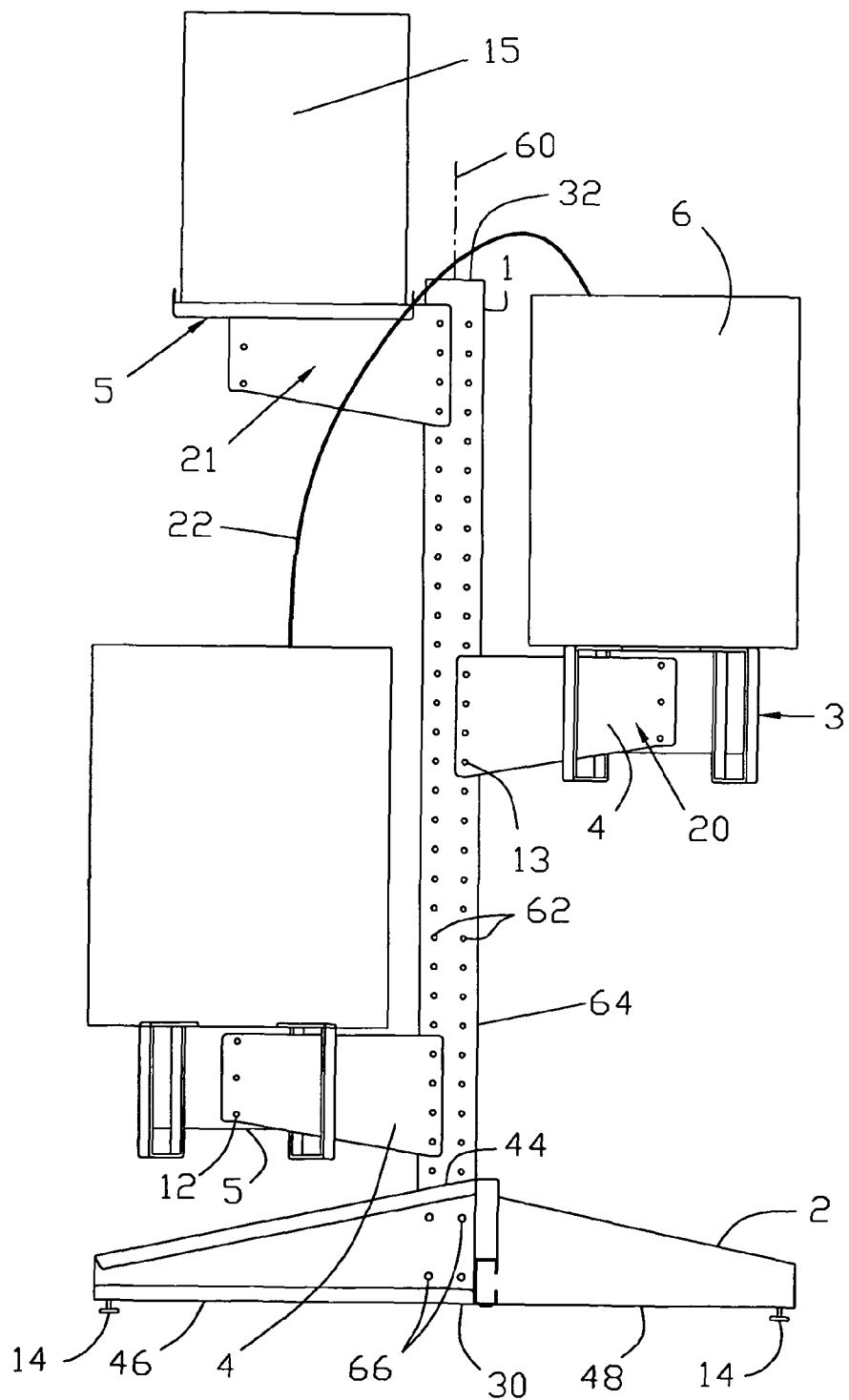
FIG. 4 is a side elevational view of an alternate stand configuration.

Referring to FIG. 1 and FIG. 2, a mast 1 is supported by a plurality of legs 2, which in this application uses four legs 2. The mast 1 defines a bottom 30 and a top 32 being spaced one from the other a preestablished distance. The mast 1 has a plurality of sides 34 being space apart a preestablished distance. In this application, four (4) sides are shown; however, other numbers of sides 34 such as three or more could be used. As an alternative the mast 1 could be round. The plurality of sides 34 connect at a corner portion 36. A plurality of webs or web members 38 interconnect the corners 36. A plurality of lighting holes 40 some being circular and others being generally rectangular or triangular in cross section are shown. Legs 2 define a first end portion 44 and a second end portion 46 being spaced one from the other. The legs 2 contain a plurality of leveling feet 14 positioned in a support surface 48 of the legs 2. The plurality of leveling feet 14 aid in leveling the unit for proper and safe operation. The plurality of leveling feet 14 are positioned near the second end portion 46 of each of the legs 2. A plurality of through holes 50 are positioned in each of the plurality of legs 2 near the first end portion 44 and when assembled to the mast 1, the through holes are in alignment with one of the plurality of T-slots 7. In this application, there are two T-slots positioned in each side and extend between the bottom and top of the mast. The T-slots are interposed a plurality of mast faces 8. The first end portion 44, when assembled to the mast 1, is in contacting relationship with at least two of the plurality of mast faces 8. The plurality of mast faces 8 extend between the bottom and top of the mast. A plurality of burner tier assemblies 3 are affixed to mast 1 with an arm 4. As best shown in FIG. 3, a pair of arms 4 are shown connected to burner assembly 3 via plurality of fasteners 13. Arms 4 are then connected to mast 1 via fasteners 10 and a plurality of T-slot nuts 9 (ref FIG. 3). The Arms 4 have a mast end portion 52 in which are position a plurality of through holes 54. In the assembled position, the plurality of through holes are aligned with the T-slots. The arms 4 have a shelf end portion 56 spaced from the mast end portion 52. The shelf end portion 56 has a plurality of through holes 58 therein and in the assembled position has a fastener 12 therein connected to one of the burner assemblies 3 or to a plurality of shelf tier assembly 5. In the assembled position, the mast end portion 52 is in contacting relationship with at least two of the mast faces 8. This forms a burner tier assembly 20. Referring back to FIG. 1, a vessels 6 rest on burner tier assembly 20. Burner tier assemblies 20 can be adjusted to an infinite number of positions vertically along the T-slot 7 (FIG. 2) and also may be installed on a face 8 of any mast 1. Referring again to FIG. 1, a shelf assembly 5 is affixed to arms 4 in lieu of burner assembly 3 when a non-fired shelf support structure is desired such as insulated cooler 15. This forms a shelf tier 21. Referring to FIG. 2, the mast cross section is shown. Preferably constructed from extruded aluminum, it contains eight mast faces 8 to allow for the mounting of arms 4 on all four sides of mast 1 as well as left and or right faces 8 on each mast 1. FIG. 3 shows arms 4 affixed to mast 1, and burner assembly 11 affixed to arms 4. With reference to FIG. 4, the mast 1 has a circular configuration, as an alternative the mast 1 could have a rectangular tube type configuration, and is generally a piece of tubing having a central axis 60 and a preestablished wall thickness. The mast 1 includes a plurality of through holes 62 being drilled or punched perpendicular to the central axis 60 and are arranged about a circumference 64 of the mast 1. A plurality of U-bolts and nuts, or bolts and nuts 66 connect the plurality of arms 4 with the mast 1. Unlike the mast 1 with the plurality of T-slots 7 making an indefinitely variable adjustment, the tube design would enable an adjustment of a plurality of preestablished intervals.

Operation of the Preferred Embodiment

Referring to FIG. 1, mast 1 is affixed to four legs 2 which supports the weight of the structure and mounted equipment, and resists the tipping forces. Leveling feet 14 are adjusted to keep mast 1 stable and reasonably perpendicular to the ground or vertical. Burner assemblies 3 and shelf assemblies 5 are affixed to arms 4 with fasteners 13. In addition, arms 4 are affixed to mast 1 via fasteners 13 and T-slot nuts 9 as shown in FIG. 3. Referring back to FIG. 1, Burner tiers assemblies 20 and shelf tiers assemblies 21 can be moved infinitely in any position vertically, and also four 90 degree increments horizontally to meet the needs of the brewer and the brewers unique equipment. For cases where liquids in the vessels 6 are to be heated, a burner tier 20 is selected. For vessels that are not to be heated, an insulated cooler 15 or a vessel 6 may be placed on shelf tiers 21. For brewers using gravity to transfer liquids from one vessel 6 to another, the shelf tiers 21 or burner tier assemblies 20 are adjusted up or down as needed so that there is sufficient vertical separation to allow siphoning and draining with the tube 22 to occur. As the brewers needs change, additional equipment is added to their system, or larger or smaller equipment etc is purchased, the burner tier assemblies 20 and shelf tier assemblies 21 can be quickly adjusted to accommodate these changes. In addition, shelf tiers 21 can be replaced or exchanged by burner tier assemblies 20 should the brewer so desire. FIG. 4 shows a ramification of the invention whereby mast 1 is replaced by mast 13 constructed of perforated tubing. While burner tier assemblies 20 and shelf tiers 21 can only be adjusted in fixed steps, it still provides adequate adjustability for proper function. Note that the beginning malt extract brewer who only utilizes one burner assembly 3 for beer-making can purchase the burner assembly 3 and as his or her brewing expertise increases, and he or she moves into all grain advanced brewing, this initial purchase can be quickly fitted into the invention without modification or replacement. Additionally, ancillary equipment such as pumps, heat exchangers, shelves, spoon holders, piping supports etc can be easily and quickly affixed to mast 1 via use of the T-slots 7 and T-slot nut 9.

Summary, Ramifications, and Scope

Many ramifications of the invention are possible. For example, the mast could be constructed out of perforated tubing (ref FIG. 4), strut channel, notched tubing (similar to storage shelving), U-bolts connecting to a rectangular or round tube etc. Another ramification is to use more than one mast for the main structural framing. Yet another ramification is to use triangular shaped masts, or masts with fewer or more T-slots. Yet another is to construct the stand with integral burners in lieu of removable burners. While this reduces functionality, it would potentially reduce the cost for those brewers not needing floor-standing burners. It is also recognized that numerous methods could be used to connect the burners to the mast in lieu of the arms shown in the preferred embodiment such as structural tubes, channels, angles, and various other sheet metal configurations.

LIST OF DRAWING NUMERALS

1. Mast
2. Plurality of Legs
3. Plurality of Burner Tier Assemblies
4. Arms—Tiers
5. Plurality of Shelf Tier Assemblies
6. Vessels
7. Plurality of T-Slots
8. Plurality of Mast Faces
9. Plurality of T-Slot Nuts
10. Fasteners
11. Burner Assembly
12. Fastener
13. Plurality of Fasteners
14. Plurality of Leveling Feet
15. Insulated Cooler
16.
17.
18.
19.
20. Burner Tier Assembly
21. Shelf Tier
22. Tube—siphon
23.
24.
25.
26.
27.
28.
29.
30. Bottom—Mast
31.
32. Top—Mast
33.
34. Plurality of Sides
35.
36. Corner Portion—Mast
37.
38. Plurality of Webs or Web Members
39.
40. Lightening Holes—Mast
41.
42.
43.
44. First End Portion—Legs
45.
46. Second End Portion—Legs
47.
48. Support Surface—Legs
49.
50. Plurality of Through Holes—Leg—First End Portion
51.
52. Mast End Portion—Arms
53.
54. Plurality of Through Holes—Arm—Mast End Portion
55.
56. Shelf End Portion—Arm
57.
58. Plurality of Through Holes—Arm—Shelf End Portion 59.
60. Central axis
61.
62. Through holes
63.
64. Circumference
65.
66. Bolts and nuts

I claim:

1. A modular stand adapted for use with a brewing process, comprising:

a mast defining a bottom, a top and a plurality of sides, said sides connecting at a corner portion, positioned on each of said plurality of sides are a plurality of mast faces extend between said bottom and said top, a plurality of T-slots are positioned on each of said plurality of sides and are interposed said plurality of mast faces, said plurality of T-slots extend between said bottom and said top, each of said plurality of mast faces forming a continuous mast face from said bottom to said top, said plurality of T-slots forming a continuous T-slot from said bottom to said top;

a plurality of legs being removably attached to said mast near said bottom, each of said plurality of legs having a first end portion, a second end portion, and a support face, said first end portion being positioned in contacting relationship with at least two of said plurality of mast faces, and a through hole being positioned in said first end portion and being in alignment with one of said plurality of T-slots, a nut being positioned in at least one of said plurality of T-slots and being aligned with said through hole and having a fastener positioned in said through hole and threadedly securing said plurality of legs with said mast, said support face neat said second end portion having a leveling device attached thereto positioning said mast in a vertical position;

and a plurality of tier assemblies being removably attached to said mast, each of said plurality of tier assemblies being movably spaced from said bottom and said top at a vertical positions, each of said plurality of tier assemblies having an arm defining a mast end portion and a shelf end portion, the mast end portion having a through hole positioned therein and is in alignment with one of said plurality of T-slots, said mast end portion being positioned in contacting relationship with at least two of said plurality of mast faces, said shelf end portion has a through hole therein, each of said plurality of tier assemblies has one of a burner assembly and a shelf assembly attached by a fastener positioned in said through hole in said shelf end portion of said arm.

2. The modular stand of claim 1 wherein said mast has a plurality of lightening holes therein.

3. The modular stand of claim 1 wherein said mast has a plurality of webs interconnecting said corner portions.

4. The modular stand of claim 1 wherein said mast end portion of said arm has a plurality of through holes therein being aligned with said T-slots.

5. The modular stand of claim 1 wherein said shelf end portion of said arm has a plurality of through holes therein.

6. The modular stand of claim 1 wherein said plurality of tier assemblies are movable between an infinite number of positions between said bottom and said top of said mast.

7. A method of assembling a modular stand comprising the step of:

positioning one of a plurality of legs on a side at a bottom of a mast;

placing a first end portion of said one of the plurality of legs in contacting relationship with at least two of a plurality of mast faces on said mast;

aligning a through hole in said first end portion of said one of the plurality of legs with a T-slot in said mast;

positioning a nut in said T-slot and aligning said through hole with said nut;

inserting a fastener through said through hole in said first end portion of said one of the plurality of legs and threading said fastener into said nut;

positioning a second one of the plurality of legs on one of said side and one of another side and said bottom of said mast;

placing a first end portion of said second one of the plurality of legs in contacting relationship with at least two of the plurality of mast faces on said mast;

aligning a through hole in a first end portion of said second one of the plurality of legs with an additional T-slot in said mast;

positioning a nut in said additional T-slot and aligning said through hole with said nut;

inserting a fastener through said through hole in said first end portion of said second one of the plurality of legs and threading said fastener into said nut;

positioning a third one of the plurality of legs on one of said side and one of another side and said bottom of said mast;

placing a first end portion of said third one of the plurality of legs in contacting relationship with at least two of the plurality of mast faces on said mast;

aligning a through hole in a first end portion of said third one of the plurality of legs with a further additional T-slot in said mast;

positioning a nut in said further additional T-slot and aligning said through hole with said nut;

inserting a fastener through said through hole in said first end portion of said third one of the plurality of legs and threading said fastener into said nut;

tightening each of said fasteners in said first one of the plurality of legs, said second one of the plurality of legs, and said third one of the plurality of legs;

attaching a leveling device to a support face near a second end portion of each of said first one of the plurality of legs, said second one of the plurality of legs and said third one of the plurality of legs;

adjusting said leveling device in each of said first one of the plurality of legs, said second one of the plurality of legs, and said third one of the plurality of legs, said adjusting placing said mast in a vertical alignment;

positioning one of a plurality of tier assemblies on said mast intermediate said bottom and a top of said mast;

placing a mast end portion of an arm of said one of the plurality of tier assemblies in contacting relationship with at least two of said plurality of mast faces on said mast;

aligning a through hole in said mast end portion of said arm of said one of the plurality of tier assemblies with a T-slot in said mast;

positioning a nut in said T-slot and aligning said through hole with said nut;

inserting a fastener through said through hole in said one of the plurality of tier assemblies and threading said fastener into said nut;

tightening said fastener positioning said one of the plurality of tier assemblies on said mast intermediate said bottom and said top of said mast;

positioning a second one of the plurality of tier assemblies on said mast intermediate said one of the plurality of tier assemblies and said top of said mast;

placing a mast end portion of an arm of said second one of the plurality of tier assemblies in contacting relationship with at least two of said plurality of mast faces on said mast;

aligning a through hole in said mast end portion of said arm of said second one of the plurality of tier assemblies with a T-slot in said mast;

positioning a nut in said T-slot and aligning said through hole with said nut;

inserting a fastener through said through hole in said second one of the plurality of tier assemblies and threading said fastener into said nut; and tightening said fastener positioning said second one of the plurality of tier assemblies on said mast intermediate said first one of the plurality of tier assemblies and said top of said mast.

8. The method of assembling a modular stand of claim 7 further comprising the step of:

positioning a third one of the plurality of tier assemblies on said mast intermediate said second one of the plurality of tier assemblies and said top of said mast;

placing a mast end portion of an arm of said third one of the plurality of tier assemblies in contacting relationship with at least two of said plurality of mast faces on said mast;

aligning a through hole in said mast end portion of said arm of said third one of the plurality of tier assemblies with a T-slot in said mast;

positioning a nut in said T-slot and aligning said through hole with said nut;

inserting a fastener through said through hole in said third one of the plurality of tier assemblies and threading said fastener into said nut; and tightening said fastener positioning said third one of the plurality of tier assemblies on said mast intermediate said second one of the plurality of tier assemblies and said top of said mast.

9. The method of assembling a modular stand of claim 7 further comprising the step of:

positioning a forth one of the plurality of legs on said bottom of said mast;

placing a first end portion of said forth one of the plurality of legs in contacting relationship with at least two of the plurality of mast faces on said mast;

aligning a through hole in a first end portion of said forth one of the plurality of legs with a further additional T-slot in said mast;

positioning a nut in said further additional T-slot and aligning said through hole with said nut;

inserting a fastener through said through hole in said first end portion of said forth one of the plurality of legs and threading said fastener into said nut; and tightening said fasteners in said forth one of the plurality of legs.

10. The method of assembling a modular stand of claim 9 further comprising the step of:

attaching a leveling device to a support face near a second end portion of said forth one of the plurality of legs, and adjusting said leveling device in said forth one of the plurality of legs, said adjusting placing said mast in a horizontal alignment.

11. The method of assembling a modular stand of claim 7 further comprising the step of:

removably attaching said plurality of tier assemblies between an infinite number of positions between said bottom and said top of said mast.

12. The method of assembling a modular stand of claim 7 further comprising the step of:

positioning one of a plurality of tier assemblies on said mast intermediate said bottom and a top of said mast and positioning a second one of the plurality of tier assemblies on said mast intermediate said one of the plurality of tier assemblies and said top of said mast includes the each of the one of the plurality of tier assemblies and the second one of the plurality of tier assemblies being positioned on a same side of the mast.

13. The method of assembling a modular stand of claim 7 further comprising the step of:

positioning one of a plurality of tier assemblies on said mast intermediate said bottom and a top of said mast and positioning a second one of the plurality of tier assemblies on said mast intermediate said one of the plurality of tier assemblies and said top of said mast includes the each of the one of the plurality of tier assemblies and the second one of the plurality of tier assemblies being positioned on a different side of the mast.

14. A modular stand comprising:

a mast defining a bottom, a top and a plurality of sides, said sides connecting at a corner portion, positioned on each of said plurality of sides are a plurality of mast faces extend between said bottom and said top, a plurality of T-slots are positioned on each of said plurality of sides and are interposed said plurality of mast faces, said plurality of T-slots extend between said bottom and said top, each of said plurality of mast faces forming a continuous mast face from said bottom to said top, said plurality of T-slots forming a continuous T-slot from said bottom to said top;

a plurality of legs being removably attached to said mast near said bottom, each of said plurality of legs having a first end portion, a second end portion, and a support face, said first end portion being positioned in contacting relationship with at least two of said plurality of mast faces, and a through hole being positioned in said first end portion and being in alignment with one of said plurality of T-slots, a nut being positioned in one of said plurality of T-slots and being aligned with said through hole and having a fastener positioned in said through hole and threadedly securing said plurality of legs with said mast, said support face neat said second end portion having a leveling device attached thereto positioning said mast in a vertical position;

a plurality of tier assemblies being removably attached to said mast, each of said plurality of tier assemblies being movably spaced from said bottom and said top at a horizontal positions, each of said plurality of tier assemblies having an arm defining a mast end portion and a shelf end portion, the mast end portion having a through holes positioned therein and is in alignment with one of said plurality of T-slots, said mast end portion being positioned in contacting relationship with at least two of said plurality of mast faces, said shelf end portion has a through hole therein, each of said plurality of tier assemblies has one of a burner assembly and a shelf assembly attached by a fastener positioned in said through hole in said shelf end portion of said arm; and a brewing apparatus having a burner attached to at least one of said plurality of tier assemblies, one of a pot and a vessel being positioned on at least one of the plurality of tier assemblie and one of a drain or siphon being positioned in said one of said pot and vessel.

15. The modular stand of claim 14 wherein said brewing apparatus further includes a plurality of vessels positioned on a portion of said plurality of tier assemblies.

16. The modular stand of claim 14 wherein said mast has a plurality of lightening holes therein.

17. The modular stand of claim 14 wherein said mast has a plurality of webs interconnecting said corner portions.

18. The modular stand of claim 14 wherein said mast end portion of said arm has a plurality of through holes therein being aligned with said T-slots.

19. The modular stand of claim 14 wherein said shelf end portion of said arm has a plurality of through holes therein.

20. The modular stand of claim 14 wherein said plurality of tier assemblies are movable between an infinite number of positions between said bottom and said top of said mast.

* * * * *